US011062377B1

(12) United States Patent
Piroska et al.

(10) Patent No.: US 11,062,377 B1
(45) Date of Patent: Jul. 13, 2021

(54) FIT PREDICTION

(71) Applicant: Secret Sauce Partners, Inc., San Francisco, CA (US)

(72) Inventors: Zoltan Piroska, Annandale, VA (US); Zoltan Prekopcsak, Budapest (HU); Jozsef Kerekes, Hodmezovasarhely (HU); Daniel A. Nagy, Budapest (HU)

(73) Assignee: Secret Sauce Partners, Inc., San Francisco, CA (US)

( * ) Notice: Subject to any disclaimer, the term of this patent is extended or adjusted under 35 U.S.C. 154(b) by 0 days.

(21) Appl. No.: 15/815,046

(22) Filed: Nov. 16, 2017

Related U.S. Application Data

(63) Continuation of application No. 13/558,229, filed on Jul. 25, 2012, now abandoned.

(60) Provisional application No. 61/511,392, filed on Jul. 25, 2011.

(51) Int. Cl.
*G06Q 30/06* (2012.01)

(52) U.S. Cl.
CPC ..... *G06Q 30/0631* (2013.01); *G06Q 30/0643* (2013.01)

(58) Field of Classification Search
CPC ........... G06Q 30/0631; G06Q 30/0643; G06Q 30/0627
USPC ...................................................... 705/26.63
See application file for complete search history.

(56) References Cited

U.S. PATENT DOCUMENTS

| 6,665,577 | B2 * | 12/2003 | Onyshkevych | G06Q 30/06 700/130 |
| 7,092,782 | B2 * | 8/2006 | Lee | G06Q 10/087 700/132 |
| 7,421,306 | B2 * | 9/2008 | Adiseshan | G06Q 10/04 700/130 |
| 7,617,016 | B2 * | 11/2009 | Wannier | A41H 3/007 700/132 |
| 7,921,042 | B2 | 4/2011 | Jacobi et al. | |
| 8,429,025 | B2 * | 4/2013 | Fries | G06Q 30/0621 705/26.63 |

(Continued)

OTHER PUBLICATIONS

Hasler, N., Stoll, C., Rosenhahn, B., Thormahlen, T., Seidel, H., Estimating Body Shape of Dressed Humans, 2009, Computers & Graphics, vol. 33, Issue 3, pp. 211-216. (Year: 2009).*

*Primary Examiner* — Jason B Dunham
*Assistant Examiner* — Brittany E Bargeon
(74) *Attorney, Agent, or Firm* — Pillsbury Winthrop Shaw Pittman LLP

(57) ABSTRACT

Systems and methods are provided that analyze and extract implicit fit preference expressions from retailer transactional data, e.g. purchases and returns, and product data. Algorithms are provided that, among other things, extract such fit preference information. Such data may be processed offline to generate fit profiles for shoppers and then presented to such shoppers, e.g. in a friendly user interface such as on the retailer's product pages. Returning shoppers receive automatic fit predictions while first-time shoppers may receive fit predictions with a few clicks. Fit predictions may include sizes that fit a shopper best as well as other suitable garment, e.g. accessories. For example, when the system identifies the shopper as someone who has shopped at any of the online or mobile stores of the retailer before, embodiments automatically calculate fit predictions for the customer to preselect and present the size that fits her best.

15 Claims, 9 Drawing Sheets

(56) References Cited

U.S. PATENT DOCUMENTS

| | | | |
|---|---|---|---|
| 2005/0071256 A1* | 3/2005 | Singhal | G06Q 30/06 705/26.61 |
| 2007/0011173 A1 | 1/2007 | Agostino | |
| 2009/0210320 A1* | 8/2009 | Adelman | G06Q 30/02 705/26.1 |
| 2010/0293076 A1* | 11/2010 | End | G06Q 30/06 705/26.7 |
| 2011/0099122 A1* | 4/2011 | Bright | G06Q 10/04 705/348 |
| 2011/0161194 A1* | 6/2011 | Dumke | G06Q 30/02 705/26.7 |
| 2011/0231278 A1 | 9/2011 | Fries | |
| 2011/0295711 A1* | 12/2011 | Mazmanyan | G06Q 30/02 705/26.7 |
| 2012/0030060 A1 | 2/2012 | Lu et al. | |
| 2012/0030061 A1 | 2/2012 | Lu et al. | |
| 2012/0030062 A1* | 2/2012 | Stauffer | G06Q 30/00 705/26.7 |

* cited by examiner

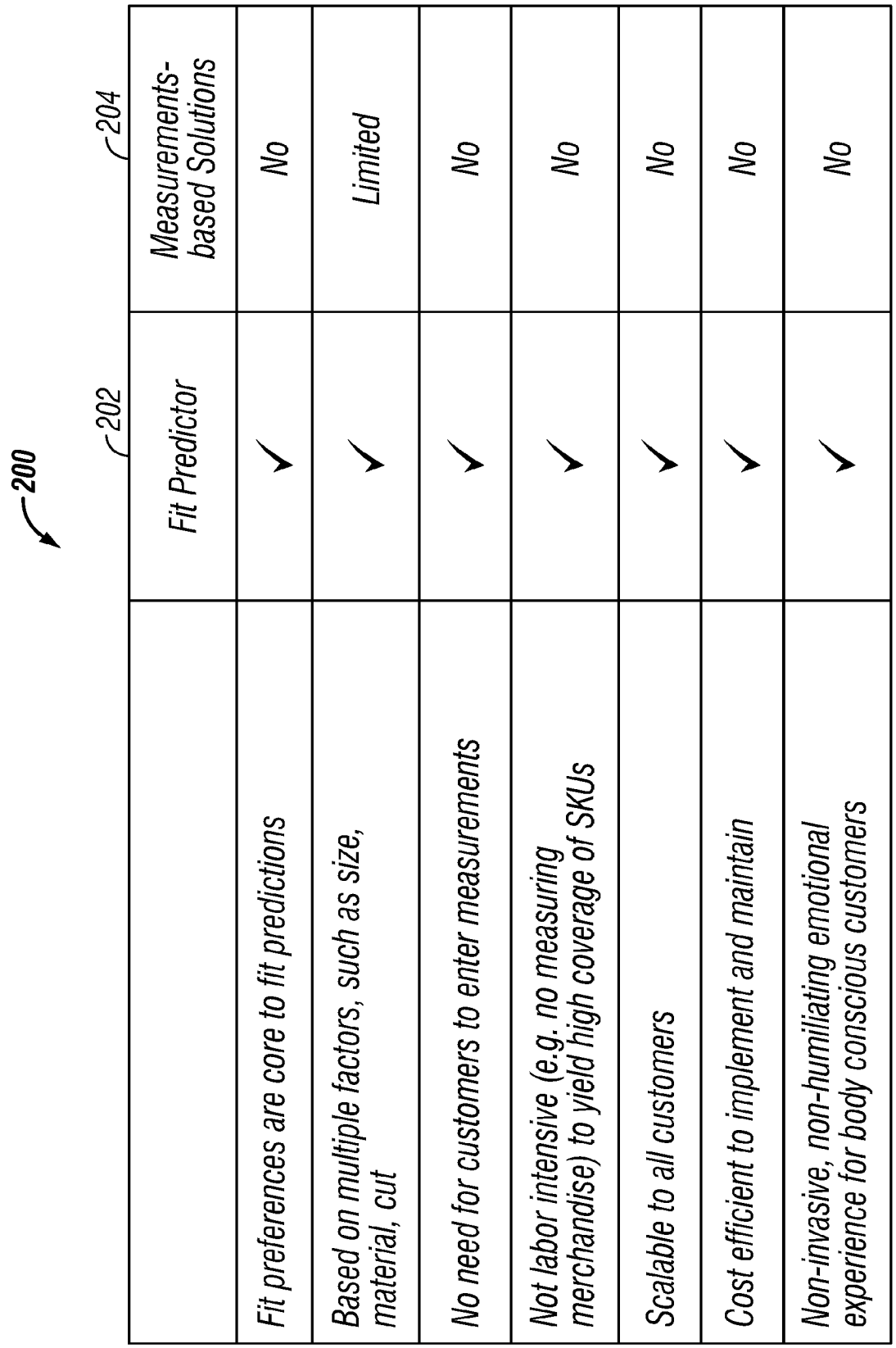

| 200 | Fit Predictor 202 | Measurements-based Solutions 204 |
|---|---|---|
| Fit preferences are core to fit predictions | ✓ | No |
| Based on multiple factors, such as size, material, cut | ✓ | Limited |
| No need for customers to enter measurements | ✓ | No |
| Not labor intensive (e.g. no measuring merchandise) to yield high coverage of SKUs | ✓ | No |
| Scalable to all customers | ✓ | No |
| Cost efficient to implement and maintain | ✓ | No |
| Non-invasive, non-humiliating emotional experience for body conscious customers | ✓ | No |

FIG. 2

FIT PREDICTION

CROSS REFERENCE TO RELATED APPLICATIONS

The present application is a continuation of U.S. patent application Ser. No. 13/558,229, filed Jul. 25, 2012, which claims priority to U.S. Provisional Patent Application Ser. No. 61/511,392, filed Jul. 25, 2011, the contents of both or which are incorporated herein by reference in their entirety.

BACKGROUND OF THE INVENTION

Technical Field

This invention relates generally to the field of garment fitting. More specifically, this invention relates to digital and related techniques for determining garment fitting.

Description of the Related Art

With the advancement and efficiencies that come with ubiquitous use of computers and digital networks, the apparel retail industry has had its share of involvement by participating in online retail, ecommerce, using digital transactional techniques, and the like.

However, even with the onset of real-time, digital solutions, consumer challenges and retailer challenges still persist. For example, some consumer challenges may include the following:

Sixty-three percent of shoppers find it hard to find the right fitting clothes;
Consumers appear only to trust fit for brands they know well; and
Consumers experience a hassle when buying the wrong fit and a hassle of return.

Following are some example challenges for retailers across all channels, such as brick and mortar, catalog, e-commerce and m-commerce:

Cost of returns are too high;
Lack of trust in fit decreases conversion rates, especially for new customers; and
Hassle of returns reduces loyalty.

Some solutions have been pursued. For example, in U.S. Published Application No.: 20120030061, FIT RECOMMENDATION VIA COLLABORATIVE INFERENCE, filed Jul. 28, 2011, to Z. Lu and J. Stauffer, techniques for recommending a size of a subject item to fit a subject consumer are disclosed. Lu and Stauffer disclose that clusters of consumers with fit characteristics similar to the subject consumer are identified, using one or more data clustering algorithms, based on any of numerous consumer attributes, e.g. self-reported and/or inferred height, weight, body shape, body characteristics, and/or purchase histories, e.g. consumers with high overlap in terms of sets of products purchased. Information on other consumers in the cluster may be analyzed to draw conclusions on how different sizes of the subject item may fit the subject consumer. For example, the purchase history of other members of the cluster may be analyzed to determine whether other members purchased a particular size of the item, and if so, the size purchased by the other members may serve as a basis to recommend a size that may best fit the consumer. For example, if other members of the cluster purchased a particular size, then that size may be recommended to the subject consumer, or if other members of the cluster purchased and then returned a particular size, e.g. for being too small, then another, e.g. larger, size may be recommended to the subject consumer.

As another example, in U.S. Published Application No.: 20120030060, DETERMINING A LIKELIHOOD OF SUITABILITY BASED ON HISTORICAL DATA, filed Jul. 28, 2011, to Z. Lu and J. Stauffer, techniques are disclosed that may determine whether a particular item is likely to suit a consumer from a fit and/or style standpoint, using objective data produced as a result of the consumer's experiences. For example, information are analyzed regarding a consumer's experiences with certain products, e.g. purchase and return history, identification of "favorite" items, etc., and data regarding attributes of those items, e.g. technical dimension data, stylistic and fit attributes, etc., to determine the consumer's measurements and fit and/or style preferences, so that a prediction may be made regarding how a particular size of an item may suit the consumer.

SUMMARY OF THE INVENTION

Systems and methods are provided that analyze retailer transactional data e.g. purchases and returns, as well as product data. Algorithms are provided that, among other things, extract fit preference information.

In one embodiment is described a computer-implemented method for predicting fit of at least one apparel product of at least one product group for an individual shopper based upon qualitative data obtained from a plurality of purchasers, comprising:

receiving a request at a computer system that includes at least one processor for a fit prediction for the at least one apparel product of a merchant for the individual shopper;

receiving qualitative data at the computer system for apparel products of said merchant, said qualitative data comprising a plurality of size labels of each apparel product and transactional data of each apparel product, wherein said transaction data includes purchase data and return data for the apparel products of said merchant;

receiving individual shopper data for said individual shopper at the computer system, wherein said individual shopper data does not include any measurement data;

based on said qualitative data of said merchant, at the computer system, computing a normalized product sizing based on a normalized sizing scale of at least one product group for each size label of certain of the apparel products of the merchant; and responsive to receiving the request, determining, using the normalized sizing scale for the at least one product group, the fit prediction for the at least one apparel product using the computer system, wherein the fit prediction is made without using measurement data.

In an aspect, said apparel products within each product group include some apparel products containing an alphabetic sizing and other apparel products containing a numeric sizing, wherein both the alphabetic sizings and the numeric sizings are converted within the range of numeric values of the normalized sizing scale.

In another aspect, the at least one product group is a plurality of product groups, and wherein the step of computing further determines which one of the plurality of product groups in which to place each of the certain apparel products of the merchant.

In another aspect, certain of the transactional data includes a product identifier that is used in the step of computing to assist in determining which one of the plurality of product groups in which to place each of the certain apparel products of the merchant.

In other aspects, a non-transitory computer readable storage medium and apparatus related to the above are described.

BRIEF DESCRIPTION OF THE DRAWINGS

FIG. 2 is a schematic diagram of table comparing fit predictor attributes to prior art measurement-based solutions, according to an embodiment;

DETAILED DESCRIPTION OF THE INVENTION

Figure 1:
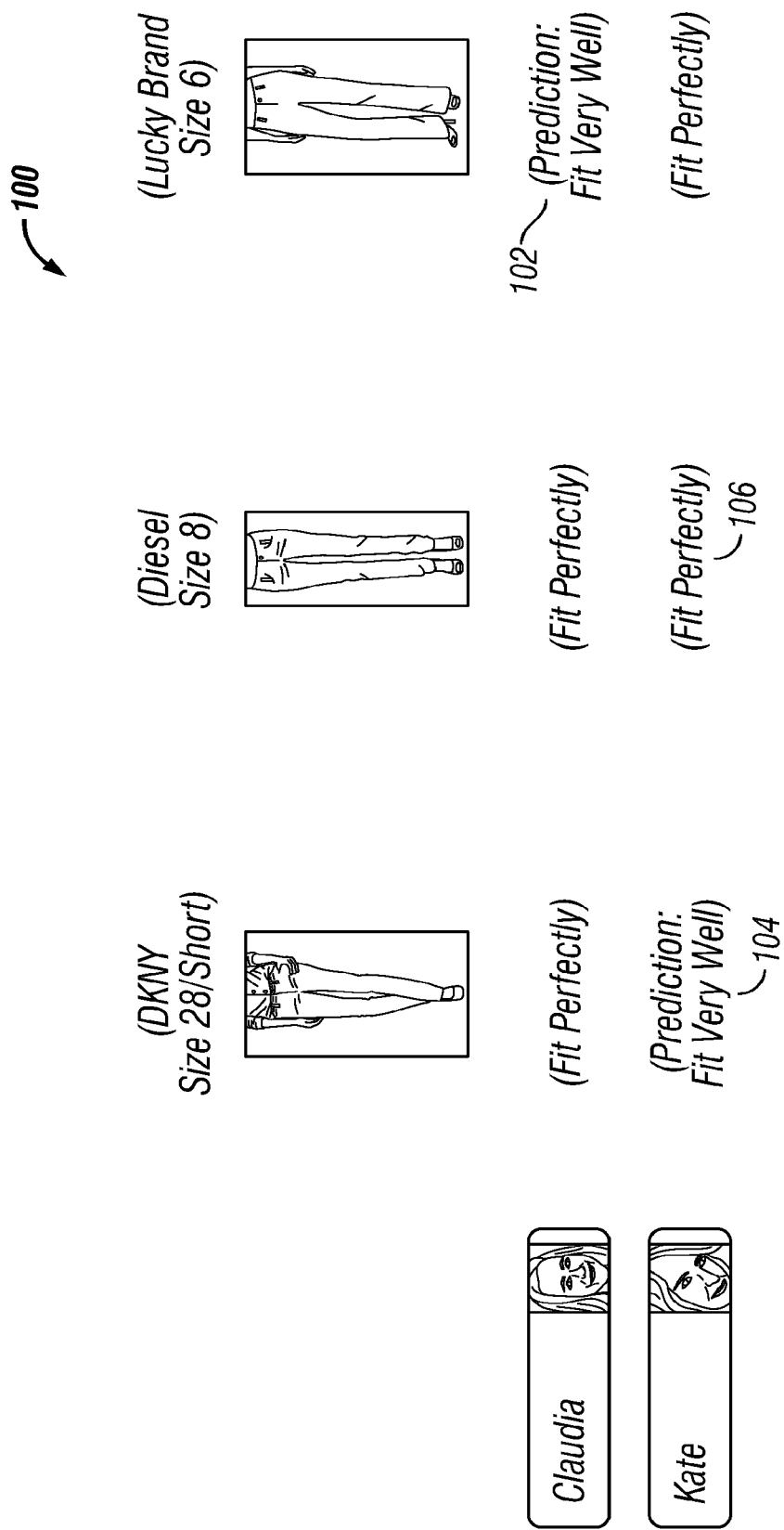
FIG. 1 is a schematic diagram illustrating that the system makes fit predictions for two customers based on knowing that a size and type of garment fits each of them well, according to an embodiment.

Systems and methods are provided that analyze and extract implicit fit preference expressions from a retailer's transactional data, e.g. purchases and returns, product data and possibly other information such as a web or mobile store's clickstream data, ratings, reviews, survey data and others. Algorithms are provided that, among other things, extract such fit preference information. Such data may be processed to generate fit profiles for shoppers and then presented to such shoppers, e.g. in a friendly user interface such as on the online retailer's product pages. Shoppers who have bought apparel items in the past receive fit predictions automatically without the need to submit any information about their fit preferences or measurements or any other data. Shoppers who have not purchased in the past may receive fit predictions by identifying one or more items that fit them. Fit predictions may include sizes that fit a shopper best as well as other suitable garment that fit them. For example, when the system identifies the shopper as someone who has shopped at any of the online or mobile stores of the retailer before, embodiments automatically calculate fit predictions for the customer to preselect and present the size that fits her best.

Fit Solutions in the Past

Sizing is a challenge both retailers and their vendors have tried to solve for decades. Commonly known approaches include body scanning or asking a shopper to submit their size measurements. Some fit vendors ask shoppers to categorize their body type such as hourglass or pear. Challenges in these cases include that shoppers often do not properly measure themselves, do not wish to take the time or are adverse to disclosing size measurements or body types they see as unfavorable. Occasionally some shoppers provide false information. Other solutions may seek to photograph shoppers next to an item for which the exact size is known, for example a Compact Disc (CD), to attempt to extrapolate the shopper's measurements. In the approach, a consumer holds a CD and takes a picture of him- or herself with the CD in his or her hands. The algorithm detects the CD, detects the measurements, e.g. 5.25 inches, of the CD and as such extrapolates the human's dimensions. It has been found that an additional challenge with such approaches is that they are inaccurate, time consuming and unrealistic for the volume of inventory carried by a retailer.

As well, such approaches may be based on the fundamental belief that if one can measure the sizes of customers and the sizes of apparel items, the two can be matched to one another. Embodiments herein take into account considerations that such assumption is fundamentally flawed because fit does not equal size.

Size Vs. Fit; a Fundamental Shift

A garment's size is communicated to consumers via labels such as 6 or M for example. Factors that are used to decide what size label is indicated in a garment may include but are not limited to physical measurements, fabric content, cut or style, and others. Fit solutions that are based strictly on measurements do not consider that a fitted dress's measurements may be very different than that of a loose dress, or a 100% cotton shirt's measurements are different than one that contains 20% spandex, yet the same person may claim they all fit well. Furthermore, fit has a qualitative angle as well, in that that two people with the exact same body measurements may wish an apparel item to fit differently. Even in the same apparel product, one shopper may want the item to fit loosely while the other shopper with identical measurements and body shape may want it to fit snugly, therefore the other shopper may require a different size. Size and measurement based approaches fail to take this fundamentally important concept into consideration.

Fit is soft, qualitative data, which is influenced by measurements, other factors such as cut and fabric content, and the shopper's personal preferences. If fit is treated as qualitative information, the fit solution that most accurately reflects the customer's preferences must be based on qualitative data, not on measurements, which is quantitative.

Embodiments herein, sometimes referred to collectively as "Fit Predictor," take a qualitative approach and hence use customer preferences as a primary factor in its algorithm and deliver a genuine fit solution. Ultimately customers want a garment that fits well and not necessarily a garment item "measuring 36 inches at the hips".

The Fit Predictor Conceptual Framework

In an embodiment, the conceptual framework for fit predictor is based on the assumption that if people's expressed fit preferences are identical, they will prefer the same apparel items from a fit perspective.

In an ideal world a conversation with individual shoppers could be had and such shoppers may explicitly convey how well each item they own fit them, for example on a scale of 1 (worst) to 5 (best). For items where two shoppers give the same exact apparel item a score of 5 it can be claimed that there is an overlap in their fit preferences. Such correlation suggests that another item, which also scores 5 for one of the shoppers, would likely also score high for the other shopper.

An embodiment can be understood with reference to FIG. 1, a schematic diagram 100 illustrating that the system makes fit predictions for two customers based on knowing that a size and type of garment fits each of them well. FIG. 1 illustrates an example in which two shoppers, Claudia and Kate, go shopping. Both of them buy the Diesel size 8 pair of jeans 106. Further, Claudia and Kate are each asked how well such jeans fit. Thus, in the example, both of them indicate that "these jeans fit perfectly" 106.

Thus, if Claudia goes out and shops for the pants on the left-hand side, DKNY size 28-Short and indicates that the particular item fits her perfectly, then embodiments herein use the fact that there is a very high likelihood that Kate would also say that those jeans fit her well 104. Similarly, if Kate determined that Lucky Brand Size 6 fit her well, then embodiments herein may use this fact and determine that there is a very high likelihood that Claudia would also believe that such jeans in size 6 fit her well 102.

It should be appreciated that an embodiment uses data indicating that there is an overlapping fit preference, the Diesel size 8 106. Claudia and Kate have indicated their fit preference through that item. Thus, if two shoppers have an overlapping fit preference, there is a high likelihood that what one prefers the other one would also prefer and that assumption is used by embodiments herein.

An embodiment can be understood with reference to FIG. 2, a table 200 comparing fit predictor attributes to prior art measurement-based solutions. Table 200 comprises three columns: attributes of the fit predictor system; a check column indicating whether embodiments herein satisfy or have such attributes 202; and a check column indicating whether prior art measurement-based solutions satisfy or have such attributes 204. That is, FIG. 2 is a summary showing that embodiments herein have the right approach. For example, the second row indicates that an embodiment is based on multiple factors including size, but also including type of material and cut. In contrast, prior art approaches are limited in that they are based only on measurements or preferred measurements, a slightly more sophisticated version of measurement-based approaches wherein such approaches attempt to use heuristics to include material and cut and other factors to determine preferred measurements. An example heuristic may be that for pants that contain spandex the preferred waist size may be 2 inches less than those of pure cotton pants. However, such heuristics are arbitrary and may be inconsistent among consumers who have different preferences, because such heuristics do not take into consideration the personal preferences of the different consumers. As another example, the last row indicates that an embodiment is a non-invasive, non-humiliating emotional experience for body conscious consumers, whereas prior art techniques are not, because for example they require the consumer to disclose his or her size, body shape or other personal information.

Figure 3:
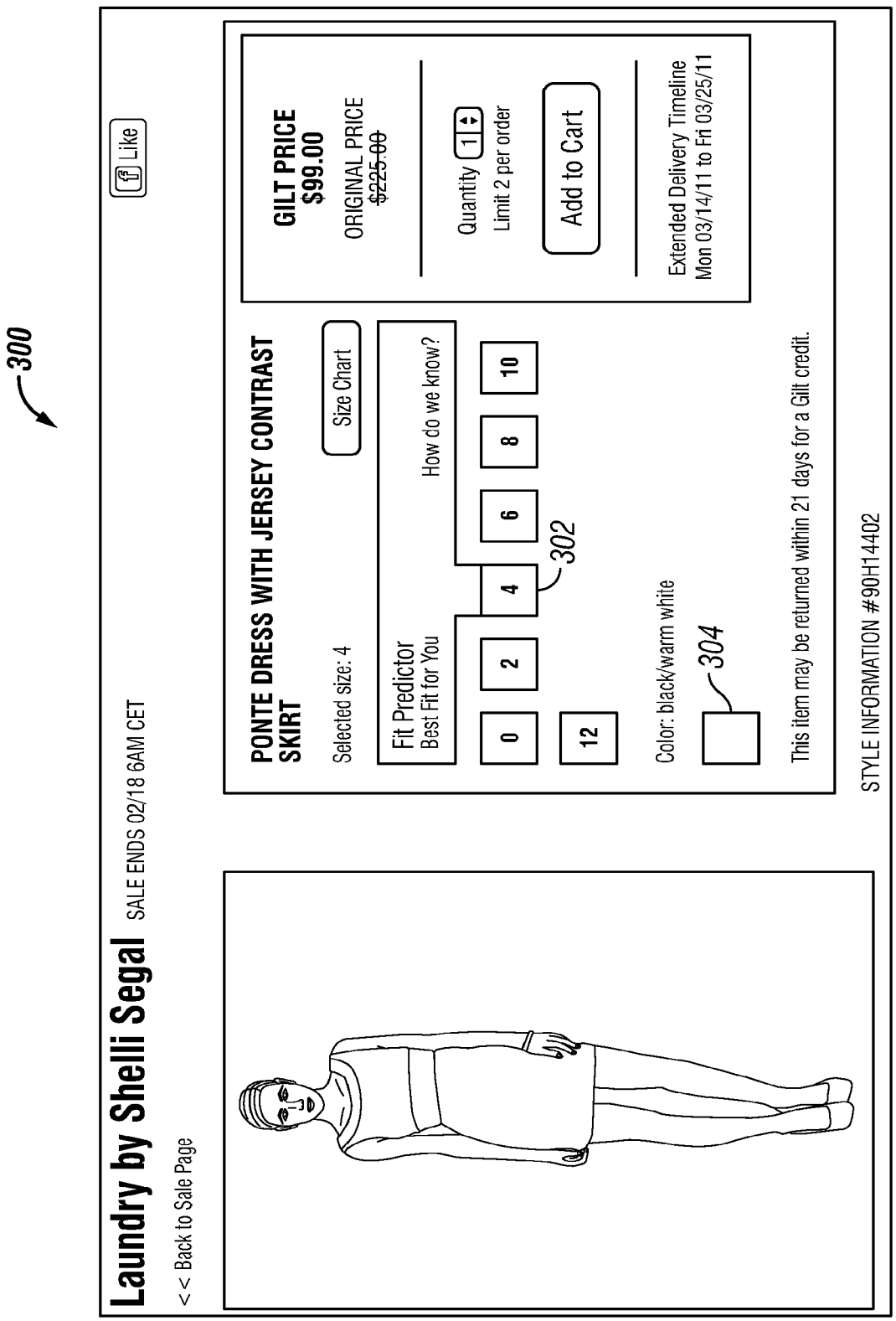
FIG. 3 is a sample user interface illustrating the resulting best fit for a shopper, according to an embodiment.

An embodiment can be understood with reference to FIG. 3, a sample user interface 300 illustrating the resulting best fit for a shopper. In this example, an embodiment analyzed, determined, and indicated to the shopper by way of such user interface that the size predicted is size 4 302. and that the predicted color scheme is black/warm white 304.

Figure 4:
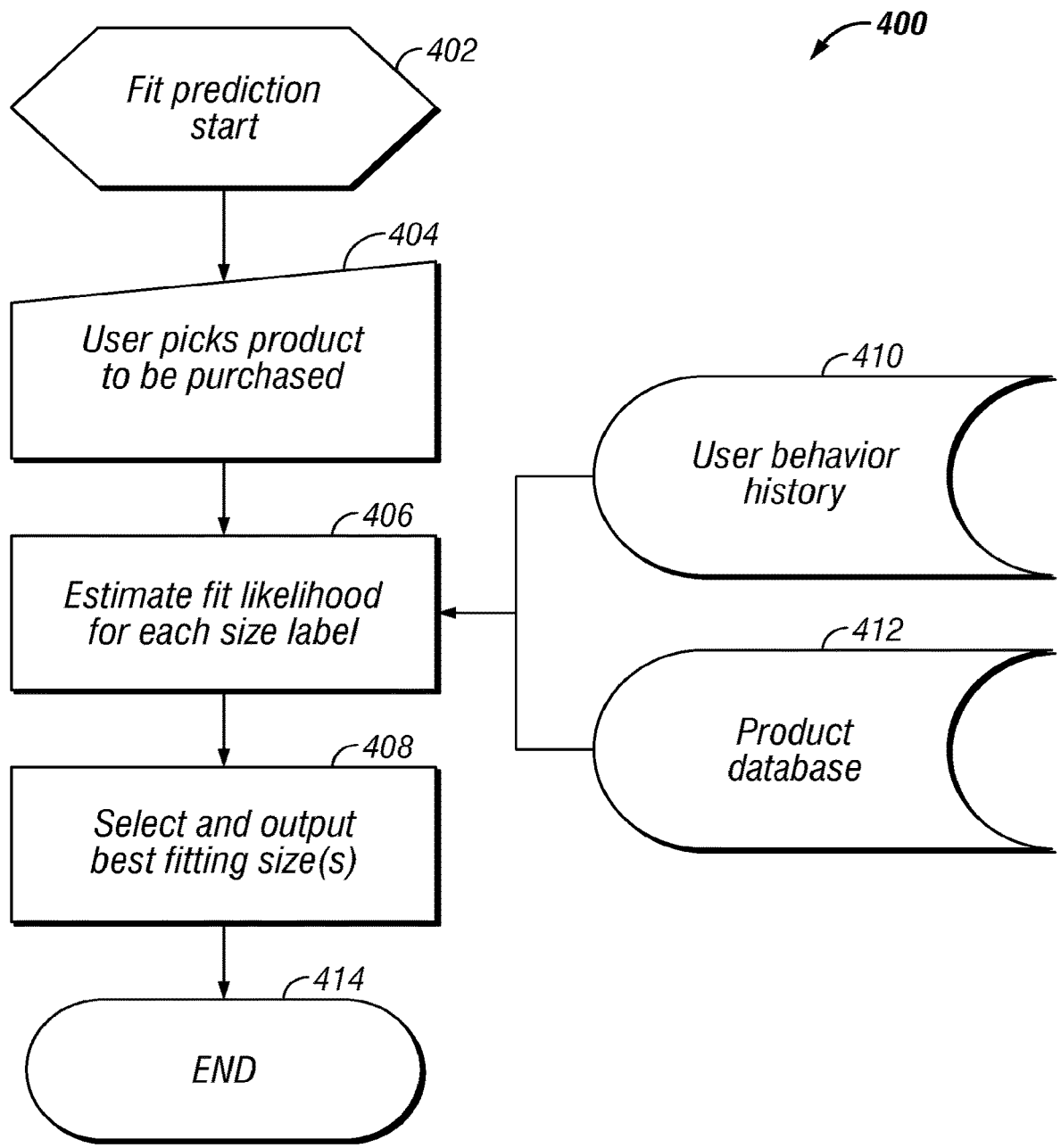
FIG. 4 is a flow diagram of a high-level algorithm for fit prediction without user involvement, according to an embodiment.

An embodiment can be understood with reference to FIG. 4, a high-level algorithm 400 for fit prediction without user involvement. The algorithm begins 402 and the algorithm receives a selection of a product 404 for a potential purchase by a user. It should be appreciated that the user does not have to be the same individual for whom the product is purchased. For example, the user may be a parent buying a product for her child. The algorithm receives relevant data from a user behavior database 410 and relevant data from a product database 412. It should be appreciated that in other embodiments, such data may reside in remote databases, local databases, in local memory, etc., and that the location of such data need not be limiting. Algorithm 400 proceeds to compute an estimated fit likelihood for each size label 406 corresponding to the inputted product at step 404. Such estimate is computed based on the received relevant user behavior data and product data. Based on the estimated fit likelihood for each size label, algorithm 400 selects and outputs the best fitting size(s) 408 and algorithm 400 ends 414.

Figure 5:
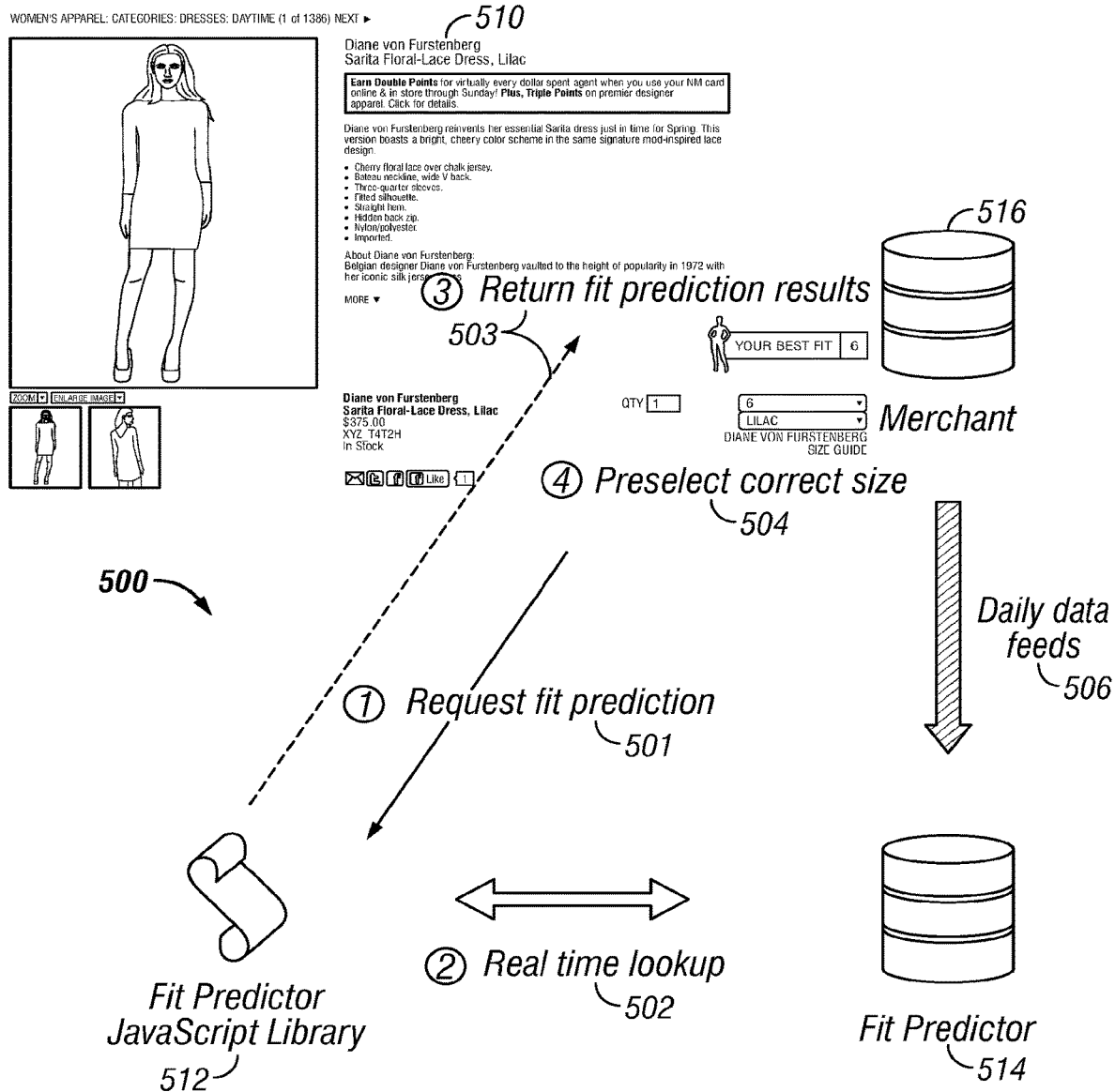
FIG. 5 is a basic flow diagram of fit prediction, according to an embodiment.

An embodiment can be understood with reference to FIG. 5, a basic flow diagram of fit prediction 500. A request for fit prediction 501 for a particular apparel item is made. For example, such request may be made from a user interface 510. It should be appreciated that the entity from which such requests are made are not meant to be limiting. As another example, a request may be made directly at a store where a user identifies an apparel item on his or her cell phone via any of a variety of methods, such as product search, bar code scanning or others. Continuing with the example, such request is sent to an application, such as for example one programmed in a Fit Predictor JAVASCRIPT™ Library 512. Application 512 performs a real-time lookup in a Fit Predictor database 514. Fit Predictor database 514 receives daily feeds about user purchasing behavior and products from the given merchant 516. It should be appreciated that the frequency of data feeds may be by merchant design and the timing is not meant to be limiting. For example, such data feeds may be performed every other day or bi-weekly, depending on design or business needs. Continuing with the example, subsequent to receiving such data, Fit Predictor JAVASCRIPT™ Library 512 generates and returns fit prediction results 503. In the example, Fit Predictor JAVASCRIPT™ Library 512 returns such results to user interface 510. However, it should be appreciated that such results may be presented in a variety of ways, such as but not limited to a text message to the user or a print out to a merchant shopkeeper, etc. Among results presented is, but is not limited to, a preselected correct size 504 for the particular apparel item or a set of other items that may fit the user. It should be appreciated that other relevant predictions might be generated and presented. For example, accessories, such as a matching belt or scarf may also be presented with preselected correct size 504.

Overview of Core Technology

In an embodiment, the following core concepts include but are not limited to an objective as follows: make a prediction how well a certain item may fit a certain person without asking explicit questions from the person.

It should be appreciated that in an embodiment, fit prediction includes estimating the likelihood of a specific apparel or shoe product of a given size label, e.g. size 6, fitting a specific person.

A confidence score is assigned to each fit prediction. Such confidence score is determined by a variety of factors such as but not limited to:

The number of data points both for the product and the person to make the prediction;

Age of the data points, e.g. a purchase 2 years ago is trusted less than a purchase 2 months ago, as people may change fit preferences due to weight gain/loss or other reasons;

Whether the product's information was extrapolated from previous similar products by the same brand, e.g. new products from consistent brands are assumed to have similar or the same fit as previous products;

Consistency of the brands or products from a fit perspective and such consistency is measurable; and Other factors.

Fit predictions may be made using fit profiles, which contain but are not limited to a set of data that determine a person's fit preference.

Fit Profiles are based on the following data about the person:

Implicit fit preference expressions, e.g. behavioral data, may include but are not limited to:
Items person purchased;
Items person returned;
Items person browses on the web site; and
Behavioral data of other persons with similar preferences.

To a lesser extent possibly because very few people express their fit preferences and as such explicit fit preference expressions may be more difficult to collect on a large scale:
Fit surveys, e.g. that indicate how well the item purchased fits on a Likert scale of 1 to 5;
Fit reviews submitted to web sites about the item including but not limited to:
Textual reviews which may be analyzed for the customer's opinion about fit;
Fit surveys as part of the review process, which is done today in a lot of online stores; and
It has been found that such fit reviews may be best to correlate with transactional information to understand what size the customer has purchased.
Fit ratings submitted after trying on the item, e.g. in a store or at a friend's, without purchasing, e.g. by scanning a barcode or RFID tag and then rating on a Likert scale of 1-5 using a mobile device for example.
Approval or disapproval expressed using third party buttons, e.g. like, +1, etc., in the online or mobile store.

An embodiment includes a core concept of making fit predictions for persons based on implicit fit preference expressions. Additional information such as explicit fit preferences or measurements are used to enhance accuracy when insufficient implicit fit preference data is available to make accurate predictions with high confidence.

A method is provided to express fit consistency, which, for purposes of understanding herein, is defined as how consistent the fit is for a group of products. Such method then scores such consistency on a scale. Using such fit consistency measure an embodiment identifies groups of products that are highly consistent and presents a list of such groups for the person to indicate which products fit her well. Such a group of products can be "fitted Calvin Klein dresses" or "skinny J. Brand jeans" or "LL Bean shirt". In an embodiment, a brand may be part of the determination of a group. In some cases additional information such as the style ("fitted", "skinny") is needed whereas in some cases the brand may be enough information.

In an embodiment, one way to collect useful explicit fit preferences before sufficient implicit fit preference information becomes available is by asking a user to indicate or provide to the system her size in such a group of products.

Fit Profiles are based on the following data about products, including data collected about the apparel and/or shoe items:
A primary data point is who buys and returns these items. Similarity between people's fit preferences can be established based on what they buy and, conversely, similarity between items from a fit preference perspective can be established by who buys them.
Secondarily and not necessarily other hard data points that can be used in fine tuning similarities include but are not limited to:
Material type;
Gender;
Cut; and
Measurements.
A tech pack may contain measurements the designers publish to manufacturers
Items can be measured post manufacturing once the item is on the market
Size charts can be used to approximate measurements but are considered very coarse
Fit models, who are a relatively limited set of people used by apparel brands for fitting their designs in the product development process.

Applications of the fit predictor technology may include but are not limited to:
Fit based personalization. That is, from an assortment of inventory create a subset of inventory that fits the person the most, e.g. determine a fit score threshold that suggests "fits very well" and the subset of items shall be the items that score above such threshold for the person.
Fit based sorting on a retailer's category web page and allowing the user to sort by fit personalized to her, e.g. sort all items by their fit scores.
Fit based filtering: similar to fit based personalization, on a retailer's category web page and allowing the user to filter items by "items that fit very well." That is, determine a fit score threshold that suggests "fits very well" and include the subset of items that score above such threshold for the person.
Fit based marketing campaigns: use fit based personalization to market a personalized assortment of apparel or shoe items that fit them the most, e.g. email marketing.
Inventory optimization. That is, understanding what fits a retailer's specific customers personalized fit information may be used to optimize order processing and inventory management.
Social shopping, e.g. people can share fit profiles with each other to allow for shopping for each other with trust in fit.

Gold Standard

For purposes of understanding herein and in accordance with an embodiment, gold standard is an important aspect for measuring accuracy of fit predictions that includes but is not limited to:
A special set of transactions used for testing for which fit expressions are known with a very high level of confidence and with statistical properties similar to those of the total transaction data set. Thus, a statistically representative sample of transactions with known fit expressions is obtained against which an algorithm's estimate of fit likelihood can be compared.

The gold standard is used for measuring the accuracy of different fit prediction algorithms as follows:

Transaction data are split at a specific time point. The fit predictor algorithm is trained on the transactions before that point and tested on the transactions from the Gold Standard after that point. For the test to be unbiased, transactions inside the Gold Standard exhibit similar essential statistical properties as unfiltered data.

Standard statistical performance metrics such as accuracy, recall and other measures derived from the ROC curve can be used to evaluate various fit predictor algorithms.

Algorithm Overview

Input Data

It should be appreciated that in a perfect world, a fit predictor system based on qualitative data would rely on explicit user feedback on fit. For example, answers to the question, referring to a specific apparel product of a specific size, "How well does it fit?" on a Likert scale may be perfect training data for such a system. Unfortunately, it has been found that collecting such explicit data on fit is expensive, not scalable and difficult to trust due to systematic challenges with surveying customers. As discussed hereinabove, an alternative approach may be to use implicit data such as merchandise purchases, returns and other behavioral data to identify patterns that suggest the extent of fit. One advantage of using implicit data is that it is highly scalable because it does not require explicit user input. It has been found that it may be challenging to filter out reliable patterns in the data set of implicit data. One is compelled to exclude patterns that poison signals of fit preference expressions.

Figure 6:
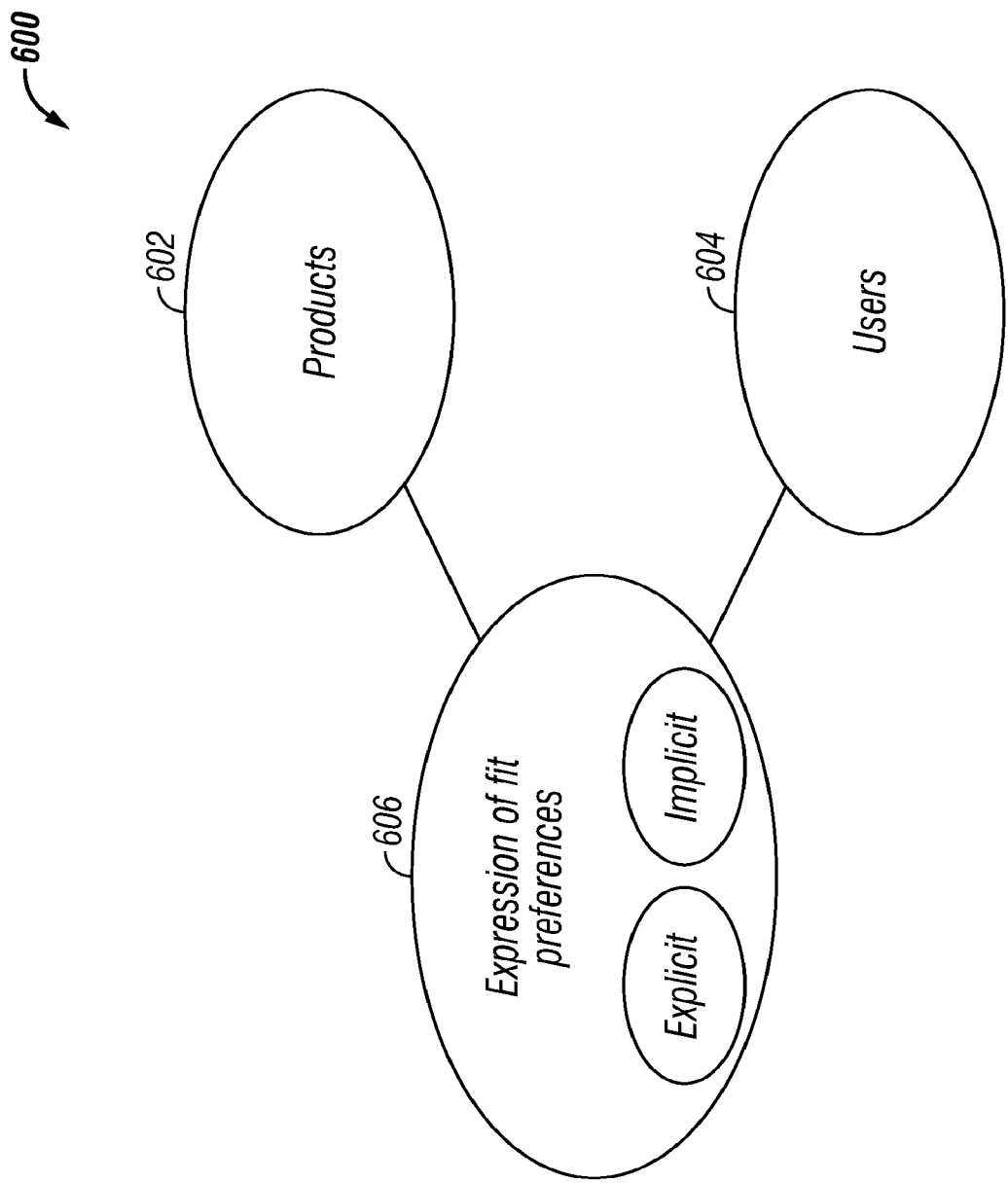
FIG. 6 is a schematic diagram of a high-level input data structure, according to an embodiment.

In an embodiment, to identify patterns of fit preference expressions, Fit Predictor uses multiple input data sets to train the algorithms. An embodiment can be understood with reference to FIG. 6, a high-level input data structure 600, which illustrates three of sets of input data. Such sets comprise, but are not limited to:

Product metadata 602;
User metadata 604; and
Fit Preference Expressions 606, which may be implicit and/or explicit.

Product Metadata

In an embodiment, fit predictor uses metadata about products, including, but not limited to, the following:
  Product identifier, e.g. UPC code
  Brand
  Product size
  Style description
  Color
  Product gender type, e.g. male, female, unisex
  Age group, e.g. kids, adult
  Product category, e.g. skirts, pants, shirts
  Fabric or material
  Cut, e.g. boot leg jeans, pencil skirt
  Manufacturing country
  Size charts, including mapping sizes, e.g. S, L, to physical measurements
  Stock status, e.g. availability of alternative sizes during a transaction for products and their sizes User Metadata In an embodiment, fit predictor identifies users before predicting for them. This may be accomplished via unique user ids and mechanisms such as but not limited to browser cookies or mobile device identifiers.

In a brick and mortar setting, loyalty cards or other identifiers may be used to track users' behaviors such as purchases, returns, what they tried on in a fitting room and others.

Additional user metadata, such as gender or country of origin may also be useful.

Expression of Fit Preferences

In an embodiment, expressions of fit preferences are important information. Expression of fit preference might be implicit and/or explicit. Explicit fit preference expressions are when a customer expresses that a particular size of a particular garment fits them well or does not fit them well. Such information is available from reviews, surveys, or any other medium through which a customer may express their preference. Implicit fit preference expressions are behavioral patterns indicating that a particular size of a particular garment fits a customer well, e.g. the customer purchases and keeps an item, or does not fit the consumer well, e.g. the customer purchases multiple sizes of an item and returns all but one size where, presumably, the returned items likely do not fit the customer well. This information may be available from transactional history. An embodiment uses primarily implicit and secondarily explicit expressions of fit preferences.

Explicit expressions include but are not limited to phone interviews, online questionnaires, and surveys. Implicit expressions include but are not limited to product purchases and returns. Implicit data are scalable and inexpensive to collect because doing so requires no additional effort by the customer; however, implicit data may be ambiguous or challenging to interpret. Explicit data tend to be more difficult to collect on a large scale and may be less trustworthy due to systemic problems, such as misaligned incentives, with surveying.

Purchase Data—Implicit

In an embodiment, Fit Predictor requires the following purchase data (other data may be optional):
  Date and time of the purchase
  Product identifier
  User identifier
  Number of items purchased Return Data—Implicit In an embodiment, fit predictor requires the following return data (other data may be optional):
  Purchase identifier to match with the corresponding purchase
  Date and time of the return
  Number of items returned An embodiment also considers whether the return policy of the merchant makes it easy or inexpensive to return an item, e.g. cannot get cash back, only store credit, or return shipping is expensive. Return policies may vary by product and time period.

Survey Data—Explicit

In an embodiment, a customer survey about each purchase provides but is not limited to the following data:
  Whether the product is a gift
  To what extent a product is a good fit, e.g. on a Likert scale of 1-5
  Explicit customer opinion whether:
    a. a smaller or larger size would fit better
    b. a different cut or style would fit better
    c. in case of bad fit, a different material would fit better
  A free text field that can be analyzed for fit-related comments such as for example "runs short"
  The reason for returning, e.g. answer choice from a list or unstructured free text that the customer filled out Other types of fit preference expressions can be used as well. Any information that may indicate a fit preference can be used by embodiments herein to build a more accurate model.

Preprocessing

In an embodiment, one goal of preprocessing is to transform the raw dataset from retail partners to a form from which machine learning algorithms can effectively learn user profiles. Thus, preprocessing includes but is not limited to the following steps:

Data cleansing;
Normalization;
Entity resolution; and
Confidence calculation.

Data Cleansing

Transactional data from merchants usually have inconsistent data quality. Thus, an embodiment filters out incorrect product identifiers, e.g. products that do not exist, corrects misspelled brands, or even drops transactions when particular or relevant fields are missing. This process varies from merchant to merchant.

Normalizing Product Sizing

Products come in different sizes and scales; therefore, an embodiment determines what the different sizes are and how they relate to each other before considering and estimating fit preference.

For example, in an embodiment, to start, the embodiment may split the products into several groups that may correlate strongly. Such groups are Female Tops, which may include shirts, t-shirts, sweaters, etc., or Bottoms, which may include jeans, skirts, shorts, pants, etc. It should be appreciated that such groups are by way of example only and are not meant to be limiting and that additional groups, e.g. Shoes or Dresses, may be used.

Embodiments herein use but are not limited to the following size concepts:

Size labels: Most products come in different sizes, e.g. M, XL, 34, etc., or size labels.
Size scale: All of the possible size labels of a product are called a size scale, e.g. alphabetic or numeric size scale.
Size chart: This is provided by the merchant or brand. It contains the physical measurements of each size label, e.g. measurements of a Gap top in size L. Each label includes multiple measurements. For example there are separate measurements for the chest, waist and hips.
Actual measurements, if available, may be used in addition to or instead of size charts.

Offsets

It should be appreciated that embodiments may not be based on measurements from size charts because two garment items may provide different measurement data for the same size label. For example, one garment item's waist labeled size 4 is 26 inches while another item's waist labeled size 4 is 28 inches. Some brands, in an effort to please their customers, engage in what is called "vanity sizing", that is they indicate a size label that is smaller than other brands for substantially similar measurements. To address offsets between reported sizes an embodiment employs an algorithmic approach using fit preference expressions.

To make the size label information useful for machine learning algorithms, embodiments herein convert such size labels to a numeric scale and then map the converted values to a normalized scale. Embodiments use the size chart or measurements for a brand or garment item to get the measurements for a size label. The smallest measurement in the group, e.g. Male Tops, is assigned the value zero and the largest is assigned a one. All the other physical sizes are normalized proportionally.

Entity Resolution for Users

In an embodiment, one purpose of entity resolution is to ensure that the system or Fit Predictor creates predictions for single entities, e.g. users. Fit Predictor cannot assume that each user id received from the merchant is associated with only one person. It is common for one customer to buy both male and female products including products for a different person of the same gender. This could be gifts or because multiple customers use the same account. For each customer Fit Predictor collects the kept apparel items with their normalized physical sizes. By analyzing the distribution of these values the system can understand the shopping habits of a given account:

If the values are concentrated, the customer mainly shops for himself/herself
If the values are concentrated with some outliers, the customer mainly shops for himself/herself with some exceptions
If the values are concentrated around two values, the customer shops for two people
If the values are concentrated around three or more values or not concentrated at all, the customer may mostly shops for others, or the behavioral data is not indicative of a single person's fit preference.

Thus, when the values are concentrated around two values, the system can create multiple profiles and ask the customer for whom is she shopping at a given moment. The easiest separation of profiles is when the two persons have different gender. Here it is not required to ask, but predict based on the gender of the particular apparel item.

When the system has user information from multiple merchants, the system can correlate the same users across their data sets. The system can use cookies, or other user identifiers, to track and identify them at another merchant or can use other user metadata to connect the profiles. User metadata such as a social network profile ID, shipping address or email address give some certainty that the two users sharing them is the same person. Thus, the system connects these users and merges their profiles above a certainty threshold.

Normalizing Expressions of Fit Preferences

In accordance with an embodiment, the system collects several types of explicit and implicit fit preferences and normalizes such for the algorithm. The normalized structure may contain but is not limited to the following attributes:

Date and time
User identifier
Product identifier, e.g. with specific size
Fit level, e.g. similar to a 1-5 Likert scale
Confidence of information In an embodiment, such fit preference expressions are converted to this data structure. Explicit expressions have a granular fit level and the confidence is very high, e.g. 4 on a Likert scale and a confidence of one. Implicit expressions have extreme fit levels, e.g. five for purchases and one for returns but lower confidences because the return may have happened for another reason, e.g. the shopper did not like the color. Implicit confidences are identified based on signals and marked by fitcodes, as discussed in detail hereinbelow.

Signals/Fitcodes

Merchants in most cases do not have explicit information on how well a certain item fit the customer. Embodiments herein have identified common patterns in the implicit data that suggest whether a certain item fit well or not. It is a common pattern that customers order multiple sizes from the very same product and return all but one. This is a strong sign for the kept size fitting, because the customer tried other sizes that she returned. There are also cases when the customer orders several colors of the same product and size and she returns one of them. In this case, embodiments can be based on the assumption that the returned item was also a good fit; she just did not like the color.

In accordance with embodiments herein, several of these fit signals are identified and used to put more trust in those data points, which suggest a good fit. This is reached by associating a fitcode for each expression of fit preference. Positive fitcodes mark different levels of trust in that the item was a good fit and negative fitcodes mark different levels of trust in the item being a bad fit.

For example, the strongest fitcode comes if a customer recently purchased different sizes of a product in the same order and returned all but one size. This indicates that the customer have tried many size options and chose the one with the best fit.

Examples of such fitcodes are determined and defined as but are not limited to the below, in Table A. It should be appreciated that such fitcodes are for illustrative purposes only and are not meant to be limiting.

TABLE A

From transactional data it is required to create Input Data. For this new columns are defined:
    CI = Count(*) GroupBy customer
    CR = Count(return=true) GroupBy customer
    OI = Count(*) GroupBy order
    OR = Count(return=true) GroupBy order
    |CSI|size = Count( Distinct (size)) GroupBy customer,product
    |CSR|size = Count( Distinct (size)) Where return=true GroupBy customer,product
    CSSI = Count(*) GroupBy customer, product, size
    CSSR Count(return = true) GroupBy customer, product, size
    DAYS = Max(ReturnDate) - OrderDate in days (this marks that we have
DAYS days of return data after this order) Constants for each merchant:
    DLIMIT = Number of days in which 90% of returns are made
Fit Codes:
Fitcodes are given in this order, so that a row which satisfies "U" cannot later be assigned a different fitcode.
    U: OR = 0 and DAYS < DLIMIT
        This order was done less than DLIMIT days ago and there is no return yet,
        so we don't know if it will be kept or not
    -Z: CSSR > 0 and CSSR < CSSI and return = true
        Customer returned this item but kept some with the same size and product
    A: |CSI|size = |CSR|size + 1 and |CSI|size > 1 and return = false
        Customer ordered several sizes from this product and returned all but one
        with this size
    -A: |CSI|size = |CSR|size + 1 and |CSI|size > 1 and return = true and not(-Z)
        Customer ordered several sizes from this product and returned these but
        kept some with one other size
    M: |CSI|size > |CSR|size + 1 and |CSI|size > 1 and return = false
        Customer ordered several sizes from this product and kept this and at least
        one other size with this product
    -M: |CSI|size > |CSR|size + 1 and |CSI|size > 1 and return = true and not(-Z)
        Customer ordered several sizes from this product and returned these but
        kept more than one other size with this product
        -R: |CSI|size = |CSR|size and
        |CSI|size > 1 and return = true
        and not(-Z) Customer ordered
        several sizes from this product
        and returned all
    B: 0 < OR/OI < 1 and |CSI|size = 1 and return = false
        Customer ordered one size from this product and kept this and returned
        other products from this order
    -B: 0 < OR/OI < 1 and |CSI|size = 1 and return = true and not(-Z)
        Customer ordered one size from this product and returned this but kept
        other products from this order
    C: 0 < CR/CI < 1 and |CSI|size = 1 and return = false and not(B)
        Customer ordered one size from this product and kept all order and returned
        some other products from other orders
    -C: 0 < CR/CI < 1 and |CSI|size = 1 and return = true and not(-B) and not(-Z)
        Customer ordered one size from this product and returned all order but kept
        other products from other orders
    D: CR = 0 and |CSI|size = 1
        Customer ordered one size from this product and kept all items in every
        order
    -D: CR = CI and |CSI|size = 1
        Customer ordered one size from this product and returned all items in every
        order
AA Fitcode may be given when A and -A were in the same order (as it is for the customer.)

Customer Confidence

Even after filtering outliers and emphasizing positive fitcodes, there still remain important differences between transactions. The prediction algorithms herein may work more accurately for some customers and products than for others.

This accuracy depends on confidence factors. For example, if a customer hasn't made any purchases for a year, then one cannot be confident that her fit profile is still accurate thus a merchant may be less confident in the prediction. Thus, time is a confidence factor. Furthermore, if a customer has a high variance in size in her purchases, then the system may also be less confident, because she may be buying for several people or changing her size relatively frequently for example. Such transactions are separated to create multiple fit profiles for such customers.

Several similar confidence factors have been identified and used as a weighting for the customers. They also affect whether a prediction is made for a given customer or not. If the system is not confident enough, then in some cases it is better not to predict a size. For one reason, a poor quality prediction may decrease trust in the fit predictor system.

Modeling

In the previous preprocessing step, it was explained how numerical values are created for customer-product pairs. For each kept item, a numerical value represents the physical size reported by the brand in the size chart. Building the model, fit preference is incorporated and looked at for inconsistencies in sizing by finding size shifts between products. Such numerical values are used for customer-product pairs as a starting point and produce several different models from them.

The models use metadata and normalized expressions of fit preference as input. They also calculate the extent of fit for all customer-product pairs. As the input and output of the model have been defined, many different models may be created and compared. Below is a list of several models that have been tried, but many other models can be created and used.

Baseline Modeling

One model is to take the average of size measurements based on the vendor's size charts for each purchased item for each customer and predict the closest size label from the size chart of each further product.

Some heuristics may be used to improve results. Following is a list of such example heuristics, which list is for illustrative purposes and is not meant to be limiting:

In case when two size labels' normalized sizes are the same distance from the predicted normalized size, the larger size label is favored Filter out Customers with large range of normalized sizes, e.g. of the items they kept Filter out Customers with large standard deviation of their normalized size distribution, e.g. of the items they kept Filter out Customers buying less than a certain number of different products.

Filter out transactions which are 'outside' of the customer's −A..A or A..−A fitcode range of normalized sizes Filter out transactions which are 'outside' of the customer's normalized size ranged defined by the most frequently bought sizes Give different weights for different fitcodes Guess more size labels for a predicted normalized size value Filter out Customer who bought/kept item for a second gender SlopeOne Modeling This model allows for distinct products to have distinct size label scales. However, the model assumes one product's size scale could be transformed to another product's size scale by an additive constant or in other words the transformation is linear and the slope always equals one.

Further Models

Thus far discussions herein include handling the size and including general fit preference, such as for example one fabric is usually preferred to have larger physical size than another, e.g. i.e. spandex vs. cotton. Such fit preference may have a global effect on the orders, but there may be personal fit preferences that may need to be taken into account. It may be the case that one group of customers prefers a loose fit at the hips and they can tolerate if the dress is too long. On the other hand, another group may have a strong preference for short length and be tolerant towards a slightly larger the size at the hip. The baseline and SlopeOne modeling above do not cover these personal preferences, because these two groups will be averaged during modeling, in which case a wrong size for both groups may be predicted. One goal of further models is to take these personal fit preferences into account. For example, other algorithms, such as collaborative filtering algorithms may be used or the SlopeOne algorithm may be extended in a way to handle personal preferences as well.

Ideally, when enough data about customers are obtained, an embodiment may calculate a preference function for them. This function may describe the fit preference of the customers on a universal fit space. Further details are discussed hereinbelow in the discussion about Model Based Prediction, which describes a possible way to represent a universal fit model.

Prediction

In an embodiment, when a customer is at the size selection action in his/her user experience, the embodiment gives a prediction based on the model built earlier. Such embodiment does not predict more than two size labels:

In some cases, for example when a user is determined to be between two sizes. Fit Predictor offers both size labels for the customer as a prediction. The smaller size may fit snugly and the larger size may fit loosely and it is up to the customer to choose one or the other.

If the algorithm calculated low fit confidence to a product for the customer, Fit Predictor does not offer a fit prediction for any of the sizes of this product, but may offer fit predictions for other products with significantly better scores.

By default Fit Predictor predicts one size for the specific product

Prediction without Historical Data

For customers whose fit preference profile is not known to Fit Predictor, an embodiment collects fit preference expressions prior to the prediction.

As a first step, the user identifies a product to Fit Predictor that fits her well. Such product is what Fit Predictor can use to determine the customer's fit profile. Unfortunately due to poor labeling practices in the apparel industry it may not be possible for the user to describe a product accurately enough so that Fit Predictor can identify it. As a less accurate, but adequate solution, Fit Predictor presents a set of brands and categories from which the user can choose at least one that fits her well. However, for this approach to work, it is required that there is high consistency within the group of products that the user identifies, e.g. J. Crew Dresses, from a fit preference perspective.

For purposes of discussion herein, consistency means that customers prefer the same size from a particular group. If multiple products of the same group are inconsistent, then customers will have mixed fit preferences for such group. An embodiment validates the consistency of groups, e.g. brands and category combinations, based on the overlapping customers and only includes consistent ones from which customers can express their fit preferences. To validate the consistency of the brand and category combination, an embodiment may use the split approach described in further detail hereinbelow.

For example, if Diesel Jeans are inconsistent, but Levi's Jeans are consistent, then in the prediction without historical data an embodiment presents Levis' Jeans only. Such embodiment may not allow the user to express her fit preference via Diesel Jeans because given the inconsistency of that group defined by the brand plus category combination, such embodiment may not be able to assign a reliable fit profile to the user.

Such is an explicit expression of fit preference, thus it is saved for future model building.

An Exemplary Algorithm—Slopeone

Figure 8:
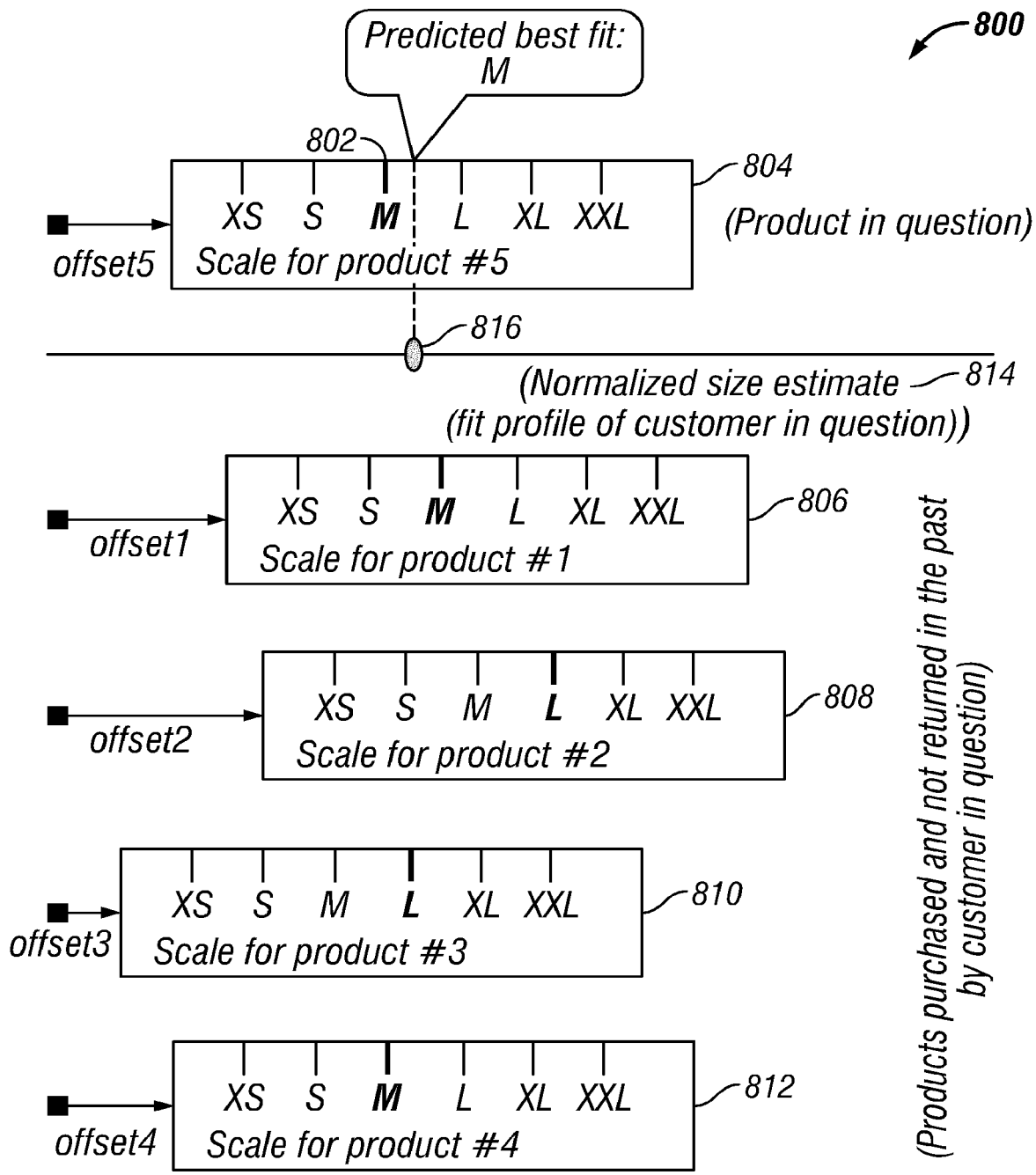
FIG. 8 is a schematic diagram illustrating the slope one algorithm, according to an embodiment.

An embodiment can be understood with reference to FIG. 8, a schematic diagram 800 illustrating the slope one algorithm. The embodiment includes but is not limited to collaborative filtering for fit prediction using zero-order regression also referred to as Slope One.

Problem Description

The goal is to quickly estimate the best-fitting size, e.g. M 802, of a particular garment for a particular person based on, for example, an online retailer's transactional data. More generally, the likelihood of each size fitting for the person can be estimated.

Solution

For purposes of understanding herein, following are a few terms and their definitions:

Scale: A sequence of size labels, e.g. XS, S, M, L, XL, XXL, for a specific garment that comes in different sizes.

Normalized size: A scalar (one-dimensional, real) function of characteristic measurements of garments. This function as well as the characteristic measurements differ from type to type, e.g. shirts, pants, etc., of garments.

Garment variant: A specific garment of a specific size.

Method of Prediction

For each garment variant, a normalized size is estimated. The initial estimate can be based on size charts or garment measurements provided by merchants or other sources. Thereafter, estimates are updated from transactional data as described below. For each person, a fit profile is compiled, comprising the normalized size preferences for each type, e.g. shirts, pants, etc., of garment. Fit preference is computed by averaging, possibly using robust averaging methods, of normalized sizes of items that the person purchased and did not return. The actual averaging method can be anything from arithmetic mean to median or one of the more sophisticated estimating techniques.

For each garment or group of garments for which sizes can be assumed to be consistent, such as those provided by a brand ensuring an adequate degree of size consistency, normalized sizes for each size label of its scale is estimated using zero-order linear regression; normalized sizes for each scale are changed only by the same additive constant for all size labels. As more data becomes available, it becomes possible to adjust normalized sizes for various size labels separately.

When predicting the best-fitting size, the corresponding normalized size preference from the fit profile of the customer is matched against the normalized size estimates along the scale of the selected garment. The prediction is the closest size label(s). In a more general setting, each size can be assigned a fitting score describing fit likelihood based on their distance from the normalized size preference in the fit profile.

For example, referring to FIG. 8, a predicted fit is desired for a particular product in question 804. In this example, four other products (806, 808, 810, and 812) had previously been purchased for the same shopper and not returned. One assumption for any product is that on any given scale, the spacing between the respective sizes is constant. That is, even though the scale of sizes may be different for each garment, however the differences between the sizes are the same. In this particular example, it has been found that for the first item 806, the customer in question bought a garment in size M, a path of which is projected onto line 814 for illustrative purposes. For the second purchased item 808, the customer bought such item in size S, the point of which is also shown projected on 814. Although for the third item 810, the customer bought such item in size L, due to the offset, the projection of the point of size L on line 814 is at the same position as the projection of the point for size S of second item 808. Finally, in the example, the customer bought a size M for item 812, the point of which is also projected onto line 814. In an embodiment, the respective offset sizes are thus used to generate a normalized size estimate 816. When normalized size estimate 816 is matched against a size in the product in question, item 804, the embodiment determines and thus predicts that size M 802, which is closest, is the best fit.

Data collected and processed as described above can also be used in applications other than selecting the best-fitting size of a particular garment, such as recommendations, supply management, etc.

An Exemplary Algorithm—Fit Prediction by Ordering

Problem Description

In an embodiment, one goal is to estimate quickly the likelihood of various sizes of a given garment fitting a particular person based purely on transaction data of an online apparel retailer.

Solution

The solution consists of two computations. The first (customer ordering) is performed asynchronously as more transaction data becomes available. The second (fit prediction) is performed on demand.

Customer Ordering

In an embodiment, a predictor maintains a partial ordering of customers by fit preference based on past purchases of items similar to the one in question. The ordering need not and may not be exact; it only needs to satisfy the following conditions with as few exceptions as possible:

Customers that have purchased and not returned items of the same size should be near one another in the ordering;

Customers that purchased larger items should be generally to the right of customers that purchased smaller items.

Partial ordering can be represented as a directed acyclic graph (DAG) whereby there is a directed path from a smaller person to the larger person. There is at least one ordering attainable by topological sorting in which all directed edges point from left to right.

If too many node selection steps in topological sorting are highly ambiguous because, for example, the graph is highly disjoint and/or too sparse, ambiguity can be resolved by looking at size preference estimates obtained by other methods, such as robust averaging of size chart measurements of purchased items or others.

Fit Prediction

Figure 7:
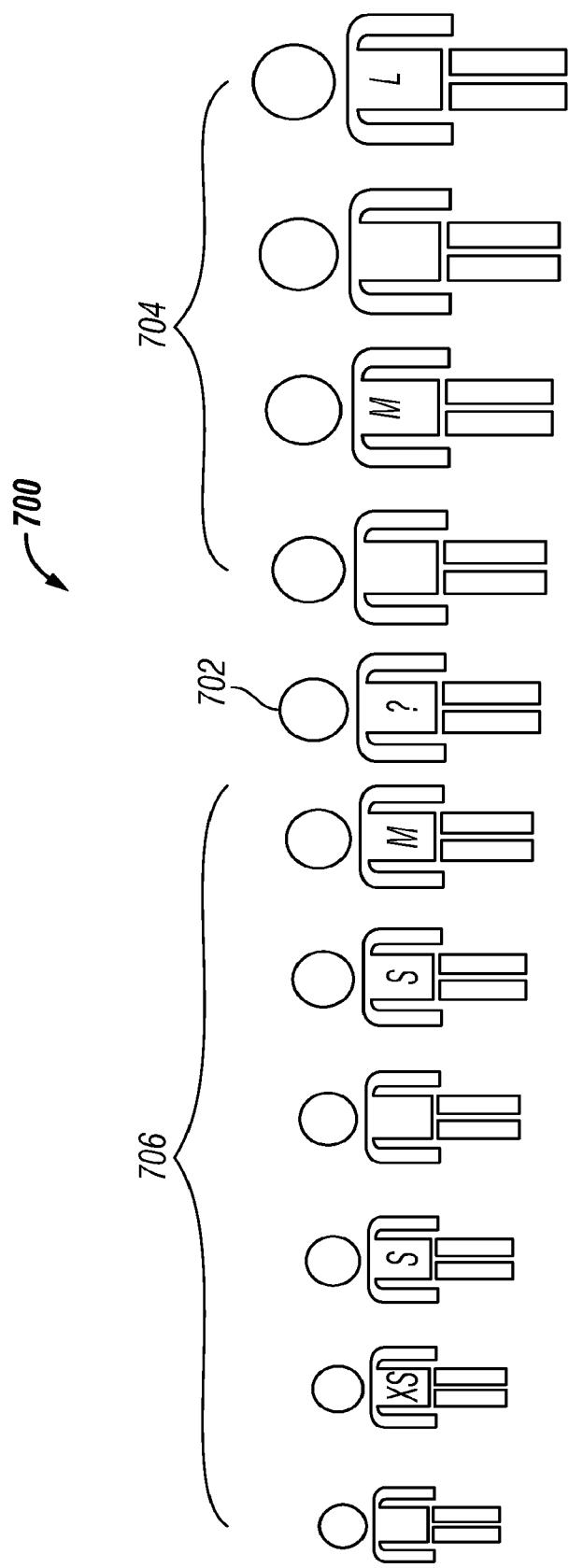
FIG. 7 is a schematic diagram of customer ordering, according to an embodiment.

An embodiment can be understood with reference to FIG. 7, a schematic diagram of customer ordering 700. For each size of the garment in question, the number of purchases by customers to the left of a particular customer 702 and to the right of particular customer 702 such as in the above described ordering is determined.

Fit scores are counted based on these counts. Generally, for each size label, the ratio of larger sizes purchased by customers to the left 704 of particular customer 702 and the number of smaller sizes purchased by customers to the right 706 decreases the fit score. The actual correspondence of these scores to fit likelihood is determined by statistical methods on the basis of past transaction data.

Benefits of Proposed Approach

Given enough transactions, the provided method is relatively robust to various inaccuracies in the assumption that items purchased and not returned fit the customer that bought them. Such information can be used to refine cruder estimates by using their output as prior probabilities. Such method does not require measurements of either garments or customers. Most of the computation is performed offline allowing for efficient use of computational resources; the computations that need to be performed in real time are very simple.

An Exemplary Algorithm—Item-Based Collaborative Filtering for Fit Prediction Problem Description In an embodiment, one goal is to estimate quickly the likelihood of various sizes of a given garment fitting a particular person based purely on transaction data of an online apparel retailer with a relatively small assortment of garments.

Solution

In an embodiment, one solution consists of two computations. The first, estimation of distributions of size labels for each product and joint distribution of size labels for each product pair, is performed asynchronously as more transaction data becomes available. The second, fit prediction, is performed on demand.

Estimating Distributions and Joint Distributions

For each product p, the distribution P(s/p) of size labels s is estimated based on counting how many times the product was purchased and not returned for each of the size labels. For each pair p1, p2 of products, the joint distributions P(s1, s2/p1, p2) of size labels s1 and s2, respectively, are estimated based on how many times the same customer bought and did not return both products with respective size labels. Based on this joint distribution, it is possible to calculate:

the conditional distributions P(s1/s2, p1, p2) of size labels s1 given the size label s2 for each of its possible values; and a similarity measure between different products.

For the purposes of saving computational resources, an embodiment does not take into account joint distributions where mutual information is too low, i.e. below some threshold value.

Fit Prediction

Using estimates described above for each item the customer in question has purchased in the past, when available, the conditional probabilities of purchasing the item in question in each of the available sizes is estimated, with the possibility of taking additional information (such as the time when those items were purchased) into account (e.g. by giving lower weight to information derived from older purchases).

An Exemplary Algorithm—Binary Prediction: Predicting a Fit-Related Binary Characteristic Problem Description In an embodiment, one goal is to estimate quickly a fit-related binary characteristic such as long or petite body shape, wide or narrow foot shape, etc., for a particular garment or shoe for a particular person based purely on transactional data of an online retailer.

Solution

In an embodiment, the following assumptions are considered.

Assumptions:

There exists some one-dimensional property about the person in question that—by being above or below a certain threshold—determines whether the person has the binary characteristic.

This threshold may be different for different products.

Method of Prediction

In an embodiment, the one-dimensional property for each person is estimated using the ratio of products with the characteristic in question that have been purchased and not returned in the past for which both variants are available.

The threshold value for each product is calculated to minimize the number of mis-characterizations of purchases that have not been returned in the past.

Prediction is based on whether the one-dimensional property of the person in question is above or below the threshold value associated with the product in question.

An Exemplary Algorithm—Splitting Algorithm

In an embodiment, one purpose of the splitting algorithm is to cluster the products in a top down way, splitting the largest cluster in two according to certain criteria. The slope one algorithm previously produced two matrices: D and F. $D_{ij}$ tells the signed value of size shifts between product i and j, hence $D_{ij}=-D_{ji}$. $F_{ij}$ tells how many values were used by slope one to compute $D_{ij}$. Note that F is a symmetric matrix. Also, $D_{ij}$ is null if slope one had no information about the size shift between product i and j. One creates a directed graph with the products as vertices and D (and F) as the adjacency matrix. The edge weights may be determined different ways as discussed below.

The splitting algorithm first finds the connected components in the graph and then partitions the largest connected component into two sets of vertices. Such step is repeated for a given number of times.

Let V be the set of vertices in the connected component, E the set of directed edges in the whole graph, and w the weight function defined on the edges based on D and F in a way described below. One goal of the splitting is to find:

$$V^{opt} = \underset{V0}{\mathrm{argmax}} \sum_{(i,j) \in E \wedge i \in V0 \wedge j \in (V \setminus V0)} w(i, j)$$

The related decision problem of this optimization is NP—hard, thus one cannot expect to find an efficient (polynomial) algorithm to solve the optimization problem exactly. Regarding approximation algorithms, as of now a semidefinite programming based approximation is known to be the best with 0.878 approximation; however the size of the domain may be too large to run it.

A simpler 0.5 approximation in expectation may be achieved by putting each vertex in $V^{opt}$ with 0.5 probability. This is used as the starting point of a greedy search. The algorithm is as follows:
1. For every v∈V put v in V1 with 0.5 probability, let V2=V\V1
2. Compute $C=\Sigma_{(i,j)\in E \wedge i \in V1 \wedge j \in (V \setminus V2)} w(i,j)$
3. If C<0 swap V1 and V2 and invert the value of C to make it positive
4. Pick a v∈V1∪V2 the putting of which into the other partition would increase C the most, let this maximal increase be m
5. If m≤0 or step 4 has been executed more times than a previously defined maximum value for the number of iterations then STOP, otherwise go to step 4.

An Exemplary Algorithm—Model Based Prediction

In an embodiment, one aim of model based prediction is to create a model which can explain why a certain apparel item (product) fits a certain customer. The model should have the lowest possible dimensionality so that it does not suffer from data dilution, yet accurate enough to be used for prediction.
The following is assumed in such model:
Each product can be described by physical parameters (circumference around the waist, neck, etc.), the more parameters available, the more accurately the model can predict fit.
The preference of every customer is specified by a set of parameters and a probability distribution based on which the model can predict the probability with which a given product with certain physical parameters fits the customer.
There exists a unified normalized scale for every physical parameter category where the measure of different products and preferences of different customers can be compared.

To estimate how many parameters are needed for the prediction to work one may use the number of dimensions provided in size charts for such items. Based on those, one can select at most 5-6 parameters. Dimensionality can be further reduced using principal component analysis (PCA).

It may be assumed that the range of unified normalized scale is (0.0, 1.0) for every parameter. Because the physical parameters of products may be on different scales, e.g. S, M, L or 2, 4, 6, etc., parameters need to be mapped to the unified normalized scale. As a first approximation, it is assumed that this mapping may be done by a linear function with an offset when the given measurement of the product are already mapped into a (0.0,1.0) scale in a sorted way, i.e. M is assigned a smaller value than L. This results in a separate linear mapping of sizes for each product. On this non-universal scale let $\vec{v}_p$ denote the measurements of product p. Let $\vec{\theta}_s$ be the mapping vector for a given size s. On the universal scale the i-th parameter of the product has the following measurement:

$$(U_p)_i = (\vec{\theta}_s)_i (\vec{\theta}_s)_i$$

Similarly, for every c customer one may assign an $\vec{U}_c$ vector and $P_c(\vec{U}_p | \vec{U}_c)$ which describes c's preferences, i.e. p may fit c customer with probability $P_c(\vec{U}_p)$. For simplicity one may assume that $P_c(\vec{U}_p | \vec{U}_c) = P_c(\vec{U}_p - \vec{U}_c)$ i.e. only depends on the difference between the size of p and the preference of c. Also, it may be assumed that $P_c$ is independent of c (customers have the same tolerance). In conclusion it may assumed that:

$$P_c(\vec{U}_p | \vec{U}_c) = P_c(\vec{U}_p - \vec{U}_c)$$

In general what can be observed about the shape of $P(\vec{U}_p - \vec{U}_c)$ is that the peek is around 0 and the customers tolerate products which are a bit loose a lot better than when they are too small; thus for "positive values" the function is decreasing slower than for "negative values."

If for certain p and c pairs different confidence levels are defined based on the likelihood of c fits p then a probability distribution may be assigned to each confidence level. The distribution becomes more flat as the confidence level decreases. For the i-th confidence level let $P_i$ be the assigned probability distribution.

Now, suppose that parameter in the model is known and a set of training data is had, i.e. given $S=\{(c_j, p_j, T_j^i) | n \in \{1, \ldots, N\}\}$, where $T^i=1$ if the training data indicates that c customer kept p product with confidence i, and $T^i=0$ if c returned p with confidence i (i is the function of j). Then the probability of the data is:

$$L = \prod_{n \in \{1,\ldots,N\}} [P_{i(j)}(\vec{U}_{p_j} - \vec{U}_{c_j})]^{T_j^{i(j)}} [(1 - P_{i(j)}(\vec{U}_{p_j} - \vec{U}_{c_j}))]^{1-T^{i(j)}_j}$$

If $\theta_p$ and $U_c$ are unknown then $L=L(\theta_p, U_c)$. During the learning process the process searches for those $\theta_p$ and $U_c$ values which maximize $L(\theta_p, U_c)$ under the constraints $0<U_c<1$ and $0<U_p<1$.

Method 1

One way to find the optimum of L is to initialize $\theta_p$ and $U_c$ with random numbers, then find the maximum of L while keeping $\theta_p$ the same, and then switch the roles of $\theta_p$ and $U_c$, keeping $U_c$ values fixed while changing only $\theta_p$. Although such method is computationally more tractable than directly optimizing for $\theta_p$ and $U_c$ at the same time, it is likely that it would not converge to a global optimum with any arbitrary random initialization.

Method 2

A better way of the parameter learning may be to use the information from size charts for certain products to get their $\theta_p$. Using these $\theta_p$ values one can get $U_c$ for those customers who bought from the products the $\theta_p$ of which such is already known by maximizing L for the subset of the training data containing only the previously mentioned products. After having $U_c$ for a certain group of people the process may now compute $\theta_p$ for all the products these customers bought using again the relevant subset of the training data and optimizing L, and so on. Provided enough training data the domain is connected and such may improve the convergence of the training.

Problem description: Items are already partitioned into groups where in each group the size of the items uses the same scale, i.e. if two different items in the same group have, e.g. size 34, then one may assume that their physical parameters are the same. If one chooses a group and uses the scale system of that group the goal may be to create mappings from the size scales of all the other groups, such that the process may compare different products (product groups) on the same scale and indicate which items have similar physical parameters.

According to the problem description, the process needs only one $\vec{\theta}$ per group. Let G be the largest group of items with the largest number of customers who bought at least one product from G. For G $\vec{\theta}_G = \vec{1}$. The mapping from another group to G may be computed iteratively described above. An example distribution for the size preference of customer may be a triangle shaped distribution, having 3 parameters (l,c,r). The parameter c may be at the peek of the distribution. The parameter l<c may be the largest $U_p$ value where $P_c(\vec{U}_p)=0$, similarly r>c is the smallest $U_p$ value where $P_c(\vec{U}_p)=0$. Note that if p is the peak value at c then $$= \frac{2}{r-l}.$$

Method 2 of the previous section may be used starting with G, $\vec{\theta}_G = \vec{1}$. Note that the 3 parameters (l,c,r) belonging to a customer are independent of the parameters of the other customers, thus finding the optimal customer parameters in this iterative algorithm may be done independently of each other.

Finding the $\vec{\theta}_G$, that optimizes L for every G' group given a set of customers may also be done independently of each other. The optimum finding may be done by simulated annealing which may not be the fastest optimization technique for certain distributions, but would work for every distribution. The resulting $\vec{\theta}_G$, may be the size mapping from group G' to the selected G group.

To handle different category of products, e.g. sport, casual, etc., instead of having one distribution only for every client the process may need to create a distribution for every category with different (l,c,r) parameters, partition the training data for such categories, perform the training separately.

Similarly, for every fit confidence level, e.g. type A, B, etc., a different distribution may be computed.

An Example Machine Overview

Figure 9:
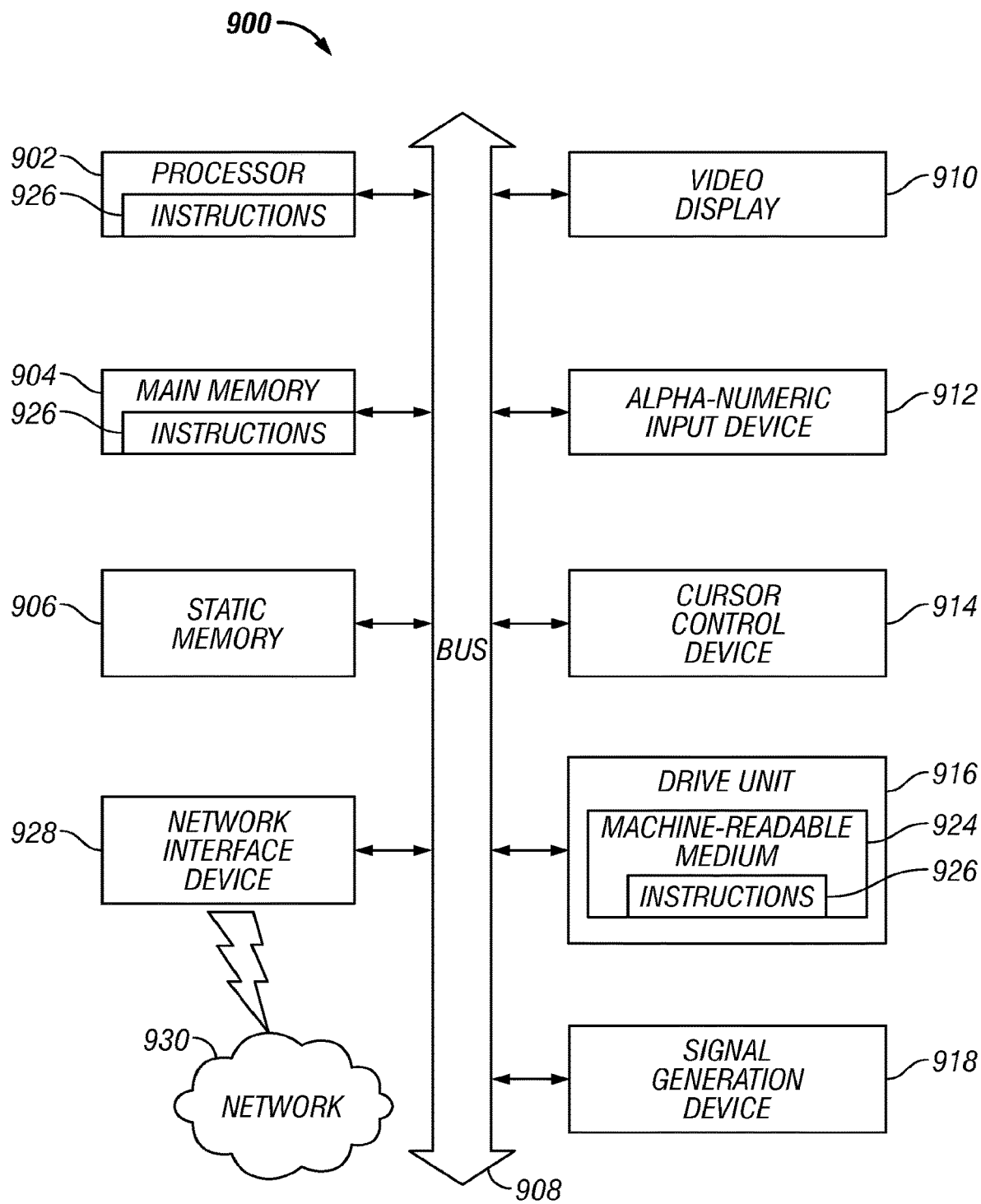
FIG. 9 is a block schematic diagram of a system in the exemplary form of a computer system according to an embodiment.

FIG. 9 is a block schematic diagram of a system in the exemplary form of a computer system 900 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 900 includes a processor 902, a main memory 904 and a static memory 906, which communicate with each other via a bus 908. The computer system 900 may further include a display unit 910, for example, a liquid crystal display (LCD) or a cathode ray tube (CRT). The computer system 900 also includes an alphanumeric input device 912, for example, a keyboard; a cursor control device 914, for example, a mouse; a disk drive unit 916, a signal generation device 918, for example, a speaker, and a network interface device 920.

The disk drive unit 916 includes a machine-readable medium 924 on which is stored a set of executable instructions, i.e. software, 926 embodying any one, or all, of the methodologies described herein below. The software 926 is also shown to reside, completely or at least partially, within the main memory 904 and/or within the processor 902. The software 926 may further be transmitted or received over a network 930 by means of a network interface device 928.

In contrast to the system 900 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to obtain fit prediction without user involvement on such internet-enabled or other network-enabled devices, servers, or clients. It further should be appreciated that one or more cloud computing embodiments include fit prediction without user involvement using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for providing fit recommendations for a product in a predetermined location of a graphic user interface comprising:

at a computer hardware system comprising a processor, the graphic user interface, system memory and a network interface for communicating with a fit predictor database, a behavior database and one or more product databases via a computer network accessible by network-enabled devices, wherein the fit predictor database is adapted to receive feeds about purchasing behavior of consumers from the behavior database and feeds about products from the one or more product databases:

receiving a request via said computer network for a fit prediction for at least one apparel or shoe product of a merchant for a consumer;

responsive to receiving the request, receiving data for apparel products or shoe products of said merchant via a product database associated with said merchant, said data comprising a plurality of size labels of each product;

receiving behavioral data for said consumer from said behavior database;

based on said consumer and said received behavioral data, computing fit estimates for each size label of the apparel or shoe product, including performing the following operations: (i) filtering out incorrect product identifiers from the received behavioral data; (ii) normalizing sizing of the apparel or shoe product to determine what different sizes are available and how they, relate to each other, the normalizing comprising converting a size label of the apparel or shoe product to a numeric value and mapping the converted value to a normalized scale; (iii) associating one or more fit codes for each expression of fit preference of said consumer for the apparel or shoe product, wherein positive fit codes represent different levels of trust in a good fit for the apparel or shoe product and negative fit codes represent different levels of trust in a bad fit for the apparel or shoe product; and (iv) calculating a confidence factor based on implicit fit preference expressions data to determine an accuracy of the fit estimates for the apparel or shoe product, wherein the fit estimates are primarily based on the implicit fit preference expressions data of said consumer to identify patterns from the implicit fit preference expressions data relating to the apparel or shoe product and the fit estimates are secondarily based on explicit fit preference expressions data or measurements, wherein the explicit fit preferences data or measurements are used to enhance accuracy of the fit estimates displayed on the graphic user interface when insufficient implicit fit preference expressions data is available for predictions based upon the confidence factor; and using said fit estimates to determine the fit prediction to display product recommendations to said consumer via the graphic user interface based on fit.

2. The computer-implemented method of claim 1, wherein the fit estimates are computed based on said behavioral data, which is collected without any action by the consumer aimed at collecting such data.

3. The computer-implemented method of claim 1, wherein said behavioral data comprises the implicit or explicit fit preference expressions data about said consumer and at least one apparel product or one pair of shoes.

4. The computer-implemented method of claim 3, wherein said implicit fit preference expressions data comprise any of: items purchased by the consumer; items returned by the consumer; items the consumer browsed on a web site; and behavioral data of other persons with similar preferences.

5. The computer-implemented method of claim 3, wherein said explicit fit preference expressions data comprise any of: fit surveys; fit reviews; fit ratings; and approval or disapproval expressed using third party indicators provided by an online or mobile store.

6. The computer-implemented method of claim 1, wherein the fit estimates are verified against fit likelihoods from a set of consumers and apparel or shoe item pairs for each of which the fit likelihood is known with a high confidence.

7. The computer-implemented method of claim 1, wherein one or more product data relating to the apparel or shoe product comprises any of:
product identifier;
brand;
product size;
style description;
color;
product gender type;
age group;
product category;
fabric or material;
cut;
manufacturing country;
item measurements;
size charts; and
stock status.

8. The computer-implemented method of claim 1, wherein a fit estimate algorithm comprises any of the following:
SlopeOne or higher order linear regression;
ordering;
item-based collaborative filtering; and
binary prediction.

9. The computer-implemented method of claim 1, wherein a fit likelihood estimation is used for any of:
ranking each size label of each product of a consumer according to fit likelihood;
selecting a set of products of specific size labels that fit the consumer above a fit likelihood threshold;
selecting a subset of such set of products of specific size labels that fit the consumer above the fit likelihood threshold to;
selecting a size label of a particular product that best fits the consumer;
selecting a set of products of specific size labels that fit the consumer below the fit likelihood threshold to indicate probable lack of fit;
providing feedback of fit information to help improve labeling consistency, product design, or marketing; and
enabling shopping for consumers other than the consumer making the purchase by using fit likelihood estimates associated with such other consumers; and
for proxy shopping for other consumers.

10. The method of claim 1 further comprising:
performing entity resolution to build one or more user profiles; and
correlating the one or more user profiles across data sets of different merchants stored in the one or more product databases.

11. The method of claim 1 further comprising assigning a confidence score to each fit prediction, the confidence score determined based on one or more of (i) number of data points both for consumer and apparel or shoe product, (ii) age of data points, (iii) whether product information was extrapolated from previous similar products of a same brand, and (iv) any measurable consistency of product or brand from a fit perspective.

12. The method of claim 1 wherein each fit code is adapted to correspond with one or more of the following:

(i) order was received by the system less than a preconfigured number of days previously and there has been no return yet;
(ii) customer ordered several sizes of an item but returned all of them;
(iii) customer ordered one size of a purchased item and kept all items ordered;
(iv) customer returned a purchased item but kept others of a same item with a same size;
(v) customer ordered several sizes of an item and returned some but kept at least one item of another size;
(vi) customer ordered several sizes of an item and kept all of them as well as at least one different size; and
(vii) customer ordered several sizes of an item and returned some of them but kept more than one of the several sizes.

13. A non-transitory computer readable storage medium having stored thereon a computer program comprising a program code executable by a computer hardwire system comprising a processor, a graphic user interface, system memory and a network interface for communicating with a fit predictor database, a behavior database and one or more product databases via a computer network accessible by network-enabled devices, the operations comprising:
   receiving feeds about purchasing behavior of consumers from the behavior database;
   receiving feeds about products from the one or more product databases;
   receiving a request via said computer network for a fit prediction for at least one apparel or shoe product of a merchant for a consumer;
   responsive to receiving the request, receiving data for apparel products or shoe products of said merchant via a product database associated with said merchant, said data comprising a plurality of size labels of each product;
   receiving behavioral data for said consumer from said behavior database;
   based on said consumer and said received behavioral data, computing fit estimates for each size label of the apparel or shoe product, including performing the following operations:
      (i) filtering out incorrect product identifiers from the received behavioral data;
      (ii) normalizing sizing of the apparel or shoe product to determine what different sizes are available and how they relate to each other, the normalizing comprising converting a size label of the apparel or shoe product to a numeric value and mapping the converted value to a normalized scale;
      (iii) calculating a confidence factor based on implicit fit preference expressions data to determine an accuracy of the fit estimates for the apparel or shoe product,
   wherein the fit estimates are primarily based on the implicit fit preference expressions data of said consumer to identify patterns from the implicit fit preference expressions data relating to the apparel or shoe product and the fit estimates are secondarily based on explicit fit preference expressions data or measurements, wherein the explicit fit preferences data or measurements are used to enhance accuracy of the fit estimates displayed on the graphic user interface when insufficient implicit fit preference expressions data k available for predictions based upon the confidence factor; and
   using said fit estimates to determine the fit prediction to display product recommendations to said consumer via the graphic user interface based on fit.

14. A computer hardware apparatus comprising:
   a processor;
   a graphic user interface;
   system memory; and
   one or more network interfaces for communicating with a database system via a computer network accessible by network-enabled devices, the database system comprising a fit predictor database, a behavior database and one or more product databases, wherein the processor is adapted to perform operations, the operations comprising:
   receiving a request via said computer network for a fit prediction for at least one apparel or shoe product of a merchant for a consumer;
   receiving, responsive to receiving the request, data for apparel products or shoe products of said merchant via a product database associated with said merchant, said data comprising a plurality of size labels of each product;
   receiving behavioral data for said consumer from said behavior database;
   computing, based on said consumer and said received behavioral data, fit estimates for each size label of the apparel or shoe product;
   associating one or more fit codes for each expression of fit preference of said consumer for the apparel or shoe product, wherein positive fit codes represent different levels of trust in a good fit for the apparel or shoe product and negative fit codes represent different levels of trust in a bad fit for the apparel or shoe product; and
   using said fit estimates to determine the fit prediction to display product recommendations, via the graphic user interface, to said consumer based on fit,
   wherein the computing operations comprise:
   filtering out incorrect product identifiers from the received behavioral data;
   normalizing sizing of the apparel or shoe product to determine what different sizes are available and how they relate to each other, the normalizing comprising converting a size label of the apparel or shoe product to a numeric value and mapping the converted value to a normalized scale; and
   calculating a confidence factor to determine an accuracy of the fit estimates for the apparel or shoe product, the confidence factor calculated based on emphasizing positive fit codes for the apparel or shoe product.

15. The apparatus of claim 14 wherein each fit code is adapted to correspond with one or more of the following:
   (i) order was received by the system less than a preconfigured number of days previously and there has been no return yet;
   (ii) customer ordered several sizes of an item but returned all of them;
   (iii) customer ordered one size of a purchased item and kept all items ordered;
   (iv) customer returned a purchased item but kept others of a same item with a same size;
   (v) customer ordered several sizes of an item and returned some but kept at least one item of another size;
   (vi) customer ordered several sizes of an item and kept all of them as well as at least one different size;
   (vii) customer ordered several sizes of an item and returned some of them but kept more than one of the several sizes;

(viii) customer ordered one size of the item and kept it but returned other items in a same order; and
(ix) customer ordered one size of an item and returned it but kept other items in a same order.

* * * * *